Feb. 6, 1945.　　　M. CAVICCHIOLI　　　2,369,018
SAFETY VALVE
Filed May 4, 1944

INVENTOR.
MARIO CAVICCHIOLI
BY Edward J. Douglass
ATTORNEY.

Patented Feb. 6, 1945

2,369,018

UNITED STATES PATENT OFFICE 2,369,018

SAFETY VALVE

Mario Cavicchioli, New York, N. Y.

Application May 4, 1944, Serial No. 534,098

1 Claim. (Cl. 277—45)

This invention relates to new and useful improvements in safety valves especially for use in restaurants and other places using pressure water boilers and coffee urns.

The ordinary valve, especially after long use, tends to freeze in its housing with the consequent exploding or collapsing of the boiler or urn. The frequency of such explosions especially in second hand coffee urns speaks for the necessity of improvements in safety valves.

An object of this invention is to provide a simple, effective and fool-proof safety valve which will function even though the valve freezes in its housing.

In the drawing forming part of this specification:

Figure 1:
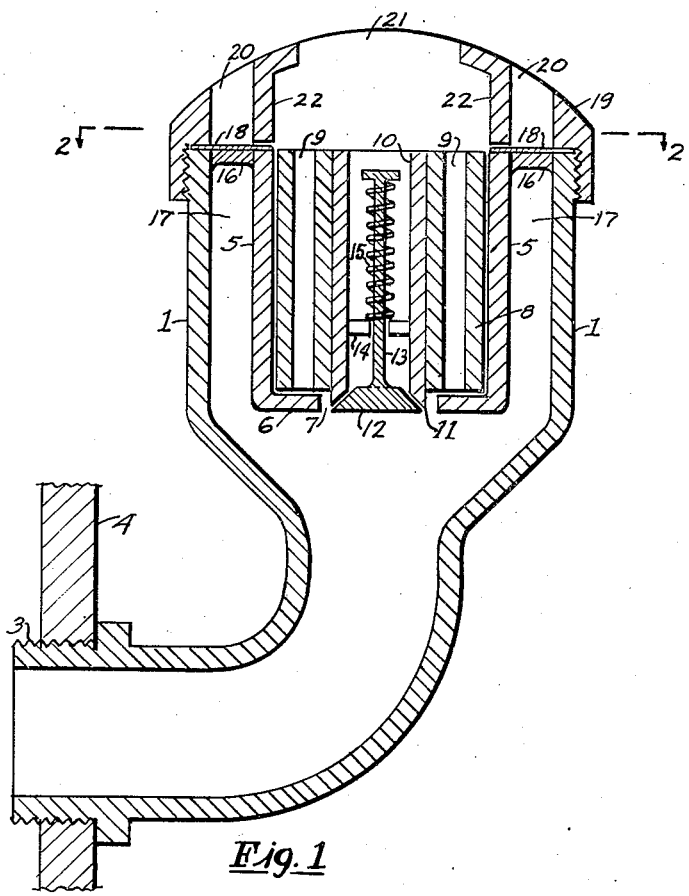
Figure 1 is a sectional elevation through the invention.
Figure 2:
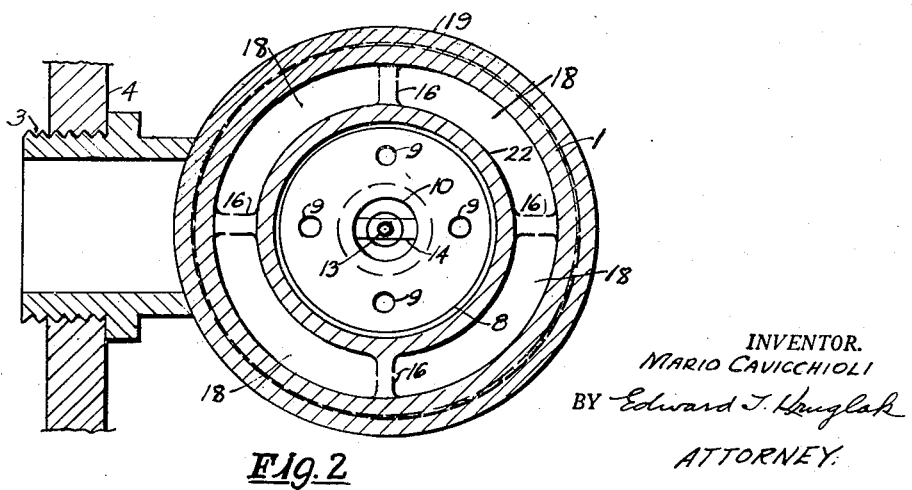
Figure 2 is a section on the line 2—2 of Figure 1 looking in the direction indicated by the arrows.

Referring to the dawing, the valve includes an outer casing 1 adapted to be connected at its lower end 3 to a pressure boiler 4, an inner casing 5 terminating in a shelf 6 provided with an opening 7, a valve-body 8 provided with a plurality of spaced openings 9 extending through it, a core 10, said core terminating in valve seat 11, said valve-body being adapted to slide in said inner casing 5 between said shelf 6 and the other end of the said casing 5, a valve 12, a valve stem 13 extending from said valve inwardly in said core 10, and adapted to slide in guide 14, a spring 15 adapted to keep said valve 12 normally in closed relationship with said valve seat 11, a plurality of spaced ribs 16 connecting the said outer casing 1 to the said inner casing 5 and forming a plurality of spaced openings 17 between the walls of said casings, a diaphragm 18 extending across said ribs 16 and openings 17, a cover 19 having a plurality of openings 20 and an opening 21, and a plurality of walls 22 extending downwardly and inwardly from the inside of said cover, said walls 22 forming a continuation of the walls of casings 1 and 5, when said cover is in a closed position, to provide communication between the opening 21 and the openings in said valve body 8 and core 10, and to provide communication between the openings 20 and the openings 17 upon the rupture of said diaphragm 18.

In operation, when the predetermined pressure is reached within the boiler, the valve body 8 is forced upward permitting the steam to escape through the opening 7, openings 9 and opening 21 to the atmosphere, until the pressure is reduced. Constant pressure will be maintained by the balancing of the valve body to permit the slow escape of steam. If a vacuum is produced suddenly in the boiler, such as would result from feeding cold water into a hot boiler after the water had been emptied, the valve 12 is sucked in permitting the entrance of air to relieve the vacuum. If for any reason the valve body 8 freezes to the casing, or in case of a vacuum, valve 12 fails to function, diaphragm 18 ruptures, permitting the escape of steam through openings 17 and 20 to the atmosphere, or the sucking in of air through said openings to relieve the vacuum in the boiler.

This invention is not limited to any particular physical embodiment, but on the contrary is susceptible of being expressed in different forms and structures, and certain of its features may be employed to the exclusion of others in view of the appended claim.

Having thus described the invention, what I claim as new and desire to secure by Letters Patent is as follows:

A safety valve for pressure boilers, including an outer casing, an inner casing within the outer casing terminating at one end in a shelf provided with an opening, a valve-body having a plurality of spaced openings extending through it in said casing adapted to be closed by said shelf in one position of said valve-body, said valve-body being provided with a core terminating at one end in a valve seat for registering with the shelf opening, said valve-body being adapted to slide to and from said shelf within said inner casing for opening and closing said spaced openings, a valve adapted to engage said valve seat, a valve stem extending from said valve inwardly in said core, a guide in said core for said valve stem, and spring means on said stem for keeping said valve normally in closed relationship with said valve seat, a plurality of spaced ribs joining said outer casing and inner casing to form a plurality of openings between the said casings, a frangible diaphragm covering said plurality of openings, a cover provided with a plurality of spaced walls extending downwardly and inwardly from the inside, said walls forming a continuation of said inner casing and said outer casing when said cover is in assembled position, an opening in said cover communicating by means of one of said walls with said openings in said valve body and core, and a plurality of spaced openings in said cover communicating by means of the remaining walls with said plurality of spaced openings between the said outer casing and inner casing upon the rupturing of said frangible diaphragm.

MARIO CAVICCHIOLI.